United States Patent [19]

Morita

[11] Patent Number: 5,344,905

[45] Date of Patent: Sep. 6, 1994

[54] DIORGANOPOLYSILOXANE AND METHOD FOR THE PREPARATION THEREOF

[75] Inventor: Yoshitsugu Morita, Ichihara, Japan

[73] Assignee: Dow Corning Toray Silicone Co., Ltd., Tokyo, Japan

[21] Appl. No.: 102,025

[22] Filed: Aug. 4, 1993

[30] Foreign Application Priority Data

Aug. 5, 1992 [JP] Japan ................................. 4-229290

[51] Int. Cl.$^5$ ............................................. C08G 77/08
[52] U.S. Cl. ........................................ 528/15; 528/27; 528/31; 528/32; 528/39
[58] Field of Search ..................... 528/27, 15, 31, 32, 528/39

[56] References Cited

U.S. PATENT DOCUMENTS 4,666,745  5/1987  Huhn et al. .................... 427/393.4
5,283,309  2/1994  Morita ............................ 528/27

FOREIGN PATENT DOCUMENTS 69528  3/1990  Japan .

Primary Examiner—Melvyn I. Marquis
Assistant Examiner—Margaret W. Glass
Attorney, Agent, or Firm—Alexander Weitz

[57] ABSTRACT

A diorganosiloxane polymer suitable for modifying thermosetting resins and its preparation are disclosed, said polymer being terminated at each molecular end with an epoxy group-containing organopolysiloxane residue of the following general formula

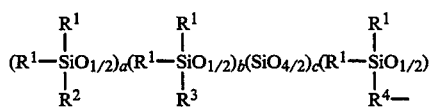

wherein $R^1$ is a monovalent hydrocarbon group free of alkenyl groups, $R^2$ is selected from the group consisting of hydrogen and a monovalent hydrocarbon group free of alkenyl groups, $R^3$ is a monovalent group selected from the group consisting of an epoxy group-containing organic group and an alkoxysilylalkyl group, with the proviso that at least one $R^3$ group is an epoxy group-containing organic group, $R^4$ is a divalent hydrocarbon group, a is zero or a positive number, b is a positive number, c is a positive number, a/c is a positive number in the range of zero to 4, b/c is a positive number in the range of 0.05 to 4, and (a+b)/c is a positive number in the range of 0.2 to 4.

17 Claims, No Drawings

DIORGANOPOLYSILOXANE AND METHOD FOR THE PREPARATION THEREOF

FIELD OF THE INVENTION

The present invention relates to a diorganopolysiloxane. More specifically, the present invention relates to a novel diorganopolysiloxane that carries epoxy-containing organopolysiloxane residues at both molecular chain terminals, as well as to a method for preparing same.

BACKGROUND OF THE INVENTION

The blending of an epoxy-containing diorganopolysiloxane into a thermosetting organic resin, such as epoxy resin, phenolic resin, and so forth, can provide the corresponding cured organic resin with properties characteristic of diorganopolysiloxanes, e.g., releaseability, weathering resistance, flexibility, and so forth. This tactic can also relax the internal stresses in these cured organic resins. For example, Japanese Patent Application Laid Open Number Sho 61-60726 (60,726/1986) proposes a diorganopolysiloxane carrying pendant epoxy groups, while Japanese Patent Application Laid Open Number Hei 2-69528 (69,528/1990) proposes a diorganopolysiloxane carrying the epoxy group at both molecular chain terminals. However, in the case of the diorganopolysiloxane proposed by Japanese Patent Application Laid Open Number Sho 61-60726, the pendant epoxy groups have a low reactivity. As a result, when this diorganopolysiloxane is blended into a thermosetting organic resin such as epoxy resin or phenolic resin, the unreacted epoxy groups remaining on the diorganopolysiloxane cause time-dependent variations in the physical properties of the cured organic resin product. The drawback to the diorganopolysiloxane proposed in Japanese Patent Application Laid Open Number Hei 2-69528 is that the number of epoxy groups is limited to 2 per molecule.

SUMMARY OF THE INVENTION

The present invention takes as its object the introduction of a novel diorganopolysiloxane that carries epoxy group-containing organopolysiloxane residues at both molecular chain terminals. A further object of the present invention is the introduction of a method for the preparation of this novel diorganopolysiloxane.

The present invention therefore relates to a diorganopolysiloxane that carries the epoxy group-containing organopolysiloxane residue with the following general formula at both molecular chain terminals

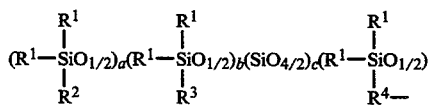

wherein $R^1$ represents a monovalent hydrocarbon group, excluding alkenyl groups, $R^2$ represents hydrogen or a monovalent hydrocarbon group, excluding alkenyl groups, $R^3$ represents an epoxy group-containing organic group or an alkoxysilylalkyl group with the proviso that at least one $R^3$ group is an epoxy group-containing organic group, $R^4$ represents a divalent hydrocarbon group, a is zero or a positive number, b is a positive number, c is a positive number, a/c is a positive number in the range of zero to 4, b/c is a positive number in the range of 0.05 to 4, and (a+b)/c is a positive number in the range of 0.2 to 4.

The present invention also relates to a method for preparation of the above diorganopolysiloxane wherein said method is characterized by the execution of an addition reaction in the presence of
(A) platinum group metal catalyst among
(B) an organopolysiloxane with the following general formula

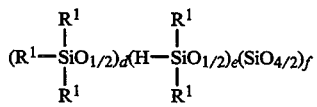

wherein $R^1$ represents a monovalent hydrocarbon group excluding alkenyl groups, d is zero or a positive number, e is a positive number, f is a positive number, d/f is a positive number in the range of zero to 4, e/f is a positive number in the range of 0.05 to 4, and (d+e)/f is a positive number in the range of 0.2 to 4;

(C) an epoxy group-containing, aliphatically unsaturated organic compound;
(D) a diorganopolysiloxane carrying alkenyl group at both molecular chain terminals; and, optionally,
(E) a freely selected quantity of an alkoxysilylalkene.

DETAILED DESCRIPTION OF THE INVENTION

The diorganopolysiloxane of the present invention carries epoxy-containing organopolysiloxane residues with the following general formula at both molecular chain terminals.

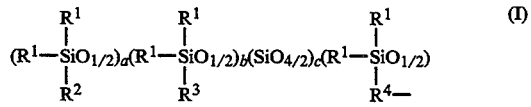

wherein $R^1$ independently represents non-alkenyl monovalent hydrocarbon groups. $R^1$ is specifically but nonexhaustively exemplified by alkyl groups such as methyl, ethyl, propyl, butyl, pentyl, and hexyl; cycloalkyl groups such as cyclopentyl, cyclohexyl, and cycloheptyl; aryl groups such as phenyl, tolyl, and xylyl; aralkyl groups such as benzyl, phenylethyl, and phenylpropyl; and substituted alkyl groups such as chloromethyl, and 3,3,3-trifluoropropyl. $R^2$ represents the hydrogen atom or non-alkenyl monovalent hydrocarbon groups, the latter being specifically exemplified by the monovalent hydrocarbon groups given above. $R^3$ represents epoxy-containing organic groups or alkoxysilylalkyl groups, with the proviso that at least one is $R^3$ is an epoxy-containing organic group. The epoxy-containing organic groups encompassed by $R^3$ are specifically but nonexhaustively exemplified by glycidoxyethyl, glycidoxypropyl, and 3,4-epoxycyclohexylethyl, while the alkoxysilylalkyl groups encompassed by $R^3$ are specifically but nonexhaustively exemplified by trimethoxysilylethyl, trimethoxysilylpropyl, dimethoxymethylsilylpropyl, methoxydimethylsilylpropyl, triethoxysilylethyl, and tripropoxysllylpropyl. In addition, $R^4$ represents a divalent hydrocarbon group and is specifically but nonexhaustively exemplified by methylmethylene, ethylene, methylethylene, propylene, butylene, and pentylene. The epoxy-containing organopolysiloxane residue is bonded to the diorganopolysiloxane of the present invention through group $R^4$.

The subscript a in formula (I) is 0 or a positive number and represents the number of monofunctional siloxane units (M unit) that contain only non-alkenyl monovalent hydrocarbon groups or non-alkenyl monovalent hydrocarbon groups and silicon-bonded hydrogen. The subscript b is a positive number that represents the number of monofunctional siloxane units (M unit) that contain epoxy-containing organic groups or alkoxysilylalkyl groups. The subscript c is a positive number that represents the number of tetrafunctional siloxane units (Q unit). Their ratios are as follows: a/c=positive number with a value of 0 to 4, b/c=positive number with a value of 0.05 to 4, and (a+b)/c=positive number with a value of 0.2 to 4. The bases for these ratios are as follows: it is not possible for more than 4 monofunctional siloxane units (M unit) to be present per 1 tetrafunctional siloxane unit (Q unit), while at least 0.05 monofunctional siloxane units (M unit) carrying an epoxy-containing organic group or alkoxysilylalkyl group must be present per 1 tetrafunctional siloxane unit (Q unit) in order for the diorganopolysiloxane of the present invention to exhibit an excellent stress relaxation activity on, and an excellent miscibility with, thermosetting organic resins.

While both molecular chain terminals of the diorganopolysiloxane of the present invention carry epoxy-containing organopolysiloxane residues, the diorganopolysiloxane comprising the main chain moiety is not specifically restricted and is exemplified by diorganopolysiloxane with the following general formula.

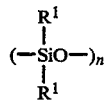

wherein $R^1$ represents non-alkenyl monovalent hydrocarbon groups and is specifically exemplified by the monovalent hydrocarbon groups given above. The subscript n in the preceding formula is a positive number that represents the degree of polymerization of the main-chain diorganopolysiloxane. While the value of n is not specifically restricted, n preferably falls within the range of 1 to 500 in order for the diorganopolysiloxane of the present invention to exhibit an excellent stress relaxation activity on, and an excellent miscibility with, thermosetting organic resins. This main-chain diorganopolysiloxane is specifically but nonexhaustively exemplified by diorganopolysiloxanes such as dimethylpolysiloxanes, methylethylpolysiloxanes, methylphenylpolysiloxanes, dimethylsiloxane-methylphenylsiloxane copolymers, dimethylsiloxane-diphenylsiloxane copolymers, diphenylpolysiloxanes, and so forth.

The diorganopolysiloxane of the present invention is a liquid or solid at room temperature. While its molecular weight is not specifically restricted, the molecular weight of the diorganopolysiloxane of the present invention preferably falls within the range of 500 to 1,000,000 in order to obtain good miscibility with the organic resin when blended into a thermosetting organic resin such as epoxy resin, phenolic resin, and so forth.

In the preparative method of the present invention, the platinum group metal catalyst comprising component (A) catalyzes an addition reaction between the silicon-bonded hydrogen in component (B) and the aliphatically unsaturated bonds in components (C), (D), and (E). The platinum group metal catalyst comprising component (A) encompasses those catalysts ordinarily used as hydrosilylation addition reaction catalysts, but is not otherwise specifically restricted. Such platinum group metal catalysts comprising component (A) are specifically but nonexhaustively exemplified by chloroplatinic acid, alcohol solutions of chloroplatinic acid, platinum-unsaturated aliphatic hydrocarbon complexes, platinum-vinylsiloxane complexes, platinum black, and platinum-on-activated carbon. The addition of component (A) in the preparative method of the present invention is not specifically restricted and generally consists of a catalytic quantity. In specific terms, the preferred range is 0.01 to 500 ppm as platinum metal in component (A) referred to component (B).

The organopolysiloxane comprising component (B) in the preparative method of the present invention is the component that introduces the organopolysiloxane residues that are bonded at both molecular chain terminals of the diorganopolysiloxane of the present invention. The organopolysiloxane comprising component (B) has the following general formula.

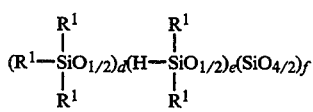

wherein $R^1$ comprises non-alkenyl monovalent hydrocarbon groups and is specifically but nonexhaustively exemplified by alkyl groups such as methyl, ethyl, propyl, butyl, pentyl, and hexyl; cycloalkyl groups such as cyclopentyl, cyclohexyl, and cycloheptyl; aryl groups such as phenyl, tolyl, and xylyl; aralkyl groups such as benzyl, phenylethyl, and phenylpropyl; and substituted alkyl groups such as chloromethyl, and 3,3,3-trifluoropropyl. The subscript d is 0 or a positive number and represents the number of monofunctional siloxane units (M unit) that contain only non-alkenyl monofunctional hydrocarbon groups; the subscript e is a positive number that represents the number of monofunctional siloxane units (M unit) that contain silicon-bonded hydrogen; and the subscript f is a positive number that represents the number of tetrafunctional siloxane units (Q unit). Their ratios are as follows: d/f=positive number with a value of 0 to 4, e/f=positive number with a value of 0.05 to 4, and (d+e)/f=positive number with a value of 0.2 to 4. The bases for these ratios are as follows: it is not possible for more than 4 monofunctional siloxane units (M unit) to be present per 1 tetrafunctional siloxane unit (Q unit), while at least 0.05 monofunctional siloxane units (M unit) carrying silicon-bonded hydrogen must be present per 1 tetrafunctional siloxane unit (Q unit) in order for the diorganopolysiloxane of the present invention to exhibit an excellent reactivity and an excellent miscibility with thermosetting organic resins.

The organopolysiloxane comprising component (B) can be prepared by methods known in the art. Methods for the preparation of component (B) are specifically but nonexhaustively exemplified by cohydrolysis of tetrahalosilane and monohalosilane, cohydrolysis of tetraalkoxysilane and monoalkoxysilane, and hydrolysis of tetraalkoxysilane and tetraorganodisiloxane and re-equilibration polymerization. In a preferred method, organosilicon compound selected from the group comprising hexaorganodisiloxane, tetraorganodisiloxane, triorganohalosilane, and diorganohalosilane is stirred in aqueous hydrogen chloride and tetraalkoxysilane is dripped into this as taught in Japanese Patent Application Laid Open Number Sho 61-195129 (195,129/1986).

Component (C) is an aliphatically unsaturated organic compound containing the epoxy group and is the component that introduces the epoxy-containing organic group into the organopolysiloxane residue. The epoxy-containing, aliphatically unsaturated organic compound comprising component (C) is specifically but nonexhaustively exemplified by vinyl glycidyl ether, allyl glycidyl ether, butenyl glycidyl ether, 1,2-epoxy-4-vinylcyclohexane, 2,3-epoxy-5-vinylnorbornane, and 1,2-epoxy-1-methyl-4-isopropenylcyclohexane.

The diorganopolysiloxane comprising component (D) in the preparative method of the present invention is the component that forms the main chain of the diorganopolysiloxane of the present invention. The diorganopolysiloxane comprising component (D) is not specifically restricted, but can be specifically exemplified by the following general formula

wherein $R_1$ independently represents non-alkenyl monovalent hydrocarbon groups, $R^5$ represents alkenyl groups, and n is a positive number. $R^1$ in the preceding formula comprises non-alkenyl monovalent hydrocarbon groups and is specifically exemplified by the monovalent hydrocarbon groups given above. $R^5$ comprises alkenyl groups and is specifically but nonexhaustively exemplified by vinyl, allyl, butenyl, pentenyl, hexenyl, and heptenyl. The subscript n is a positive number that represents the degree of polymerization of the diorganopolysiloxane. Preferably, n is a positive number in the range of 1 to 500 in order for the diorganopolysiloxane of the present invention to exhibit an excellent stress relaxation activity on and an excellent miscibility with thermosetting organic resins. The diorganopolysiloxane comprising component (D) is specifically but nonexhaustively exemplified as follows:

dimethylvinylsiloxy-terminated dimethylpolysiloxanes,
dimethylallylsiloxy-terminated dimethylpolysiloxanes,
dimethylhexenylsiloxy-terminated dimethylpolysiloxanes,
dimethylvinylsiloxy-terminated methylethylpolysiloxanes,
dimethylallylsiloxy-terminated methylethylpolysiloxanes,
dimethylvinylsiloxy-terminated methylphenylpolysiloxanes,
dimethylallylsiloxy-terminated methylphenylpolysiloxanes,
dimethylhexenylsiloxy-terminated methylphenylpolysiloxanes,
diphenylvinylsiloxy-terminated methylphenylpolysiloxanes,
dimethylvinylsiloxy-terminated dimethylsiloxane-methylphenylsiloxane copolymers,
dimethylvinylsiloxy-terminated dimethylsiloxane-diphenylsiloxane copolymers,
dimethylallylsiloxy-terminated dimethylsiloxane-diphenylsiloxane copolymers, and
dimethylvinylsiloxy-terminated diphenylpolysiloxanes.

The additions of components (C), (D), and (E) in the preparative method of the present invention preferably provide at least an equivalent number of moles of aliphatically unsaturated bonds in components (C), (D), and (E) per 1 mole of silicon-bonded hydrogen in the organopolysiloxane comprising component (B). The ratio between the individual additions of components (C) and (D) is not specifically restricted and may be freely selected.

The alkoxysilylalkene comprising the component (E) in the preparative method of the present invention is the component that introduces the alkoxysilylalkyl group into the organopolysiloxane residue. The alkoxysilylalkene comprising component (E) is specifically but nonexhaustively exemplified by trimethoxyvinylsilane, triethoxyvinylsilane, methyldimethoxyvinylsilane, allyltrimethoxysilane, allylmethyldiethoxysilane, and methoxydiphenylvinylsilane. The quantity of addition of component (E) in the preparative method of the present invention may be selected as desired, and this component is reacted along with components (C) and (D) when the alkoxysilylalkyl group must be introduced into the diorganopolysiloxane of the present invention. When component (E) is used in the preparative method of the present invention and components (C)+(D)+(E) supply less than 1 aliphatically unsaturated bond per 1 silicon-bonded hydrogen in component (B), silicon-bonded hydrogen will be present in a portion of the organopolysiloxane residues at the molecular chain terminals of the resulting diorganopolysiloxane of the present invention. On the other hand, when at least 1 aliphatically unsaturated bond is supplied per 1 silicon-bonded hydrogen in component (B), the organopolysiloxane residues at the molecular chain terminals will not possess silicon-bonded hydrogen.

The reaction sequence in the preparative method of the present invention is not specifically restricted. In one example of the reaction sequence, components (A) and (B) are first mixed, components (C) and (D) are added to the resulting system to yield diorganopolysiloxane whose molecular chain terminals are organopolysiloxane residues containing silicon-bonded hydrogen and the epoxy-containing organic group, and component (E) is added to the resulting system to give diorganopolysiloxane whose molecular chain terminals are organopolysiloxane residues containing the epoxy-containing organic group and alkoxysilylalkyl group. In another example of the reaction sequence, components (A) and (B) are first mixed, component (E) is then added to the system to yield organopolysiloxane containing silicon-bonded hydrogen and alkoxysilylalkyl, and components (C) and (D) are subsequently added to the system to give diorganopolysiloxane whose molecular chain terminals are organopolysiloxane residues containing alkoxysilylalkyl and epoxy-containing organic groups.

The reaction temperature is not specifically restricted in the preparative method of the present invention, but the reaction temperature preferably falls in the range of 50° to 150° C. in order to rapidly complete the addition reaction. Organic solvent can be used in the preparative method of the present invention. Organic solvents operable for the present invention are specifically but nonexhaustively exemplified by aromatic organic solvents such as toluene, and xylene; aliphatic organic solvents such as hexane, heptane and octane; and ketone organic solvents such as acetone and methyl ethyl ketone. Diorganopolysiloxane of the present invention prepared as described above is obtained as a reaction mixture, and it can be separated from the unreacted organopolysiloxane by standing, by using the different solubilities in organic solvent between the former and latter, or by gel permeation chromatography.

The diorganopolysiloxane of the present invention carries epoxy-containing organopolysiloxane residues at both molecular chain terminals. In consequence thereof, when it is reacted with a thermosetting organic resin such as epoxy resin, phenolic resin, polyimide resin, polyester resin, polyamide resin, and so forth, the properties characteristic of diorganopolysiloxane, such as releaseability, weathering resistance, flexibility, and so forth, are imparted to the cured organic resin and the internal stresses within the cured organic resin can be relaxed.

No separation was observed when it was allowed to stand at room temperature for 1 month. When this brown, transparent liquid was subjected to infrared spectrochemical analysis, absorption characteristic of the Si—H bond was not observed. When this liquid was analyzed by gel permeation chromatography, it was found to be composed of the following 2 components: a product with weight-average molecular weight ($M_w$)=24,600 (polystyrene standard) and dispersity ($M_w/M_n$)=1.76, and a product with weight-average molecular weight ($M_w$)=1,480 (polystyrene standard) and dispersity ($M_w/M_n$)=1.11. The former product was confirmed to be a diorganopolysiloxane with the following formula through fractionation by gel permeation chromatography and structural analysis by $^1H$, $^{13}C$, and $^{29}Si$ nuclear magnetic resonance analyses.

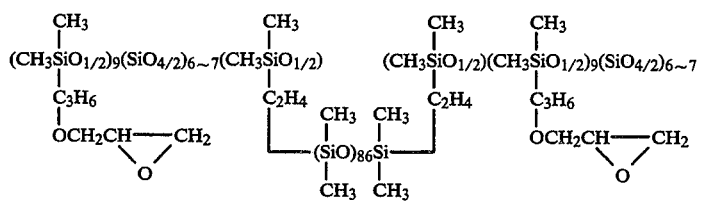

EXAMPLES

The present invention is explained in greater detail below through illustrative examples. In these examples, the viscosity is the value measured at 25° C. and the progress of the reaction was evaluated by infrared spectrochemical analysis.

EXAMPLE 1

Twenty weight parts of an organopolysiloxane with the formula

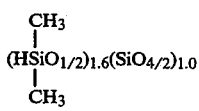

20.0 weight parts of a dimethylpolysiloxane with the formula

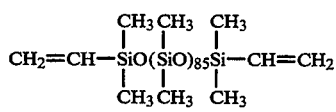

31.5 weight parts of allyl glycidyl ether, and 60 weight parts of toluene were placed in a 500 mL four-neck flask equipped with stirrer, reflux condenser, and thermometer. The water in the system was removed as the azeotrope by heating, and the system was then cooled under a nitrogen blanket. Ten drops of 2 weight % isopropanolic chloroplatinic acid solution was dripped into the system from a syringe, followed by heating with stirring at 80° C. for 1.5 hours and cooling to room temperature. Ten weight parts of allyl glycidyl ether (dried over molecular sieve) was added followed by heating at 110° C. for 2 hours and then heating at 120° C./2 mmHg to remove the toluene and excess allyl glycidyl ether. A brown, transparent liquid (62.8 weight parts ) was obtained.

This brown, transparent liquid had an epoxy equivalent weight of 390 and a viscosity of 7,040 centipoise.

In a similar manner the latter product was confirmed to be an organopolysiloxane with the following formula.

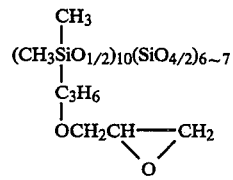

EXAMPLE 2

Fifty weight parts of an organopolysiloxane with the formula

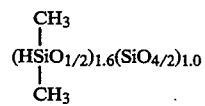

219.2 weight parts of a dimethylpolysiloxane with the formula

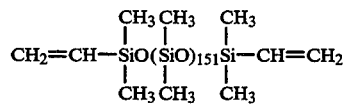

15.1 weight parts allyl glycidyl ether, and 270.0 weight parts toluene were placed in a 1 L four-neck flask equipped with stirrer, reflux condenser, and thermometer. The water in the system was removed as the azeotrope by heating, and the system was then cooled under a nitrogen blanket. Ten drops of 2 weight % isopropanolic chloroplatinic acid solution was dripped into the system from a syringe, followed by heating with stirring at 80° C. for 3 hours and cooling to room temperature. Fifty weight parts of allyl glycidyl ether (dried over molecular sieve) was added followed by heating at 110° C. for 2 hours and then heating at 120° C./2 mmHg to remove the toluene and excess allyl glycidyl ether. A turbid white liquid (316.6 weight parts) was obtained.

This turbid white liquid had an epoxy equivalent weight of 879 and a viscosity of 12,800 centipoise. No separation was observed when it was allowed to stand at room temperature for 4 months. When this turbid white liquid was subjected to infrared spectrochemical analysis, absorption characteristic of the Si—H bond was not observed. When this liquid was analyzed by gel permeation chromatography, it was found to be composed of the following 2 components in a weight ratio of 93.2:6.7: a product with weight-average molecular weight $(M_w)=53,400$ (polystyrene standard) and dispersity $(M_w/M_n)=2.44$, and a product with weight-average molecular weight $(M_w)=1\,540$ (polystyrene standard) and dispersity $(M_w/M_n)=1.12$. The former product was confirmed to be diorganopolysiloxane with the following formula.

10.4 weight parts allyl glycidyl ether, and 150 weight parts of toluene were placed in a 500 mL four-neck flask equipped with stirrer, reflux condenser, and thermometer. The water in the system was removed as the azeotrope by heating, and the system was then cooled under a nitrogen blanket. Five drops of 2 weight % isopropanolic chloroplatinic acid solution was dripped into the system from a syringe, followed by heating with stirring at 100° C. for 0.5 hours and cooling to room temperature. Allyl glycidyl ether (10.9 weight parts; dried over molecular sieve) was added followed by heating at 110° C. for 2 hours and then heating at 120° C./2 mmHg to remove the toluene and excess allyl glycidyl ether. A pale yellow liquid (115.5 weight parts) was obtained.

This pale yellow liquid had a viscosity of 1,340 centipoise. The production of a small amount of white precipitate was observed when it was allowed to stand at room temperature for 10 months. The overlying layer of pale yellow liquid had an epoxy equivalent weight of

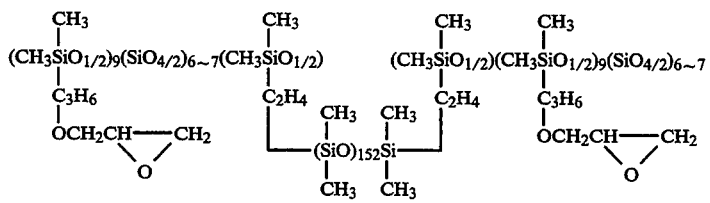

The latter product was confirmed to be organopolysiloxane with the following formula.

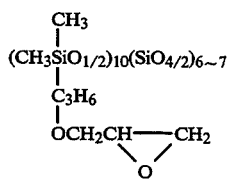

1,300. When the overlying layer of pale yellow liquid was subjected to infrared spectrochemical analysis, the absorption characteristic of the Si—H bond was observed in the product to a small degree. When this liquid was analyzed by gel permeation chromatography, a this liquid was analyzed by gel permeation chromatography, a weight-average molecular weight $(M_w)=3,180$ (polystyrene standard) and dispersity $(M_w/M_n)=1.97$ were determined. The pale yellow liquid was confirmed to be diorganopolysiloxane with the following formula.

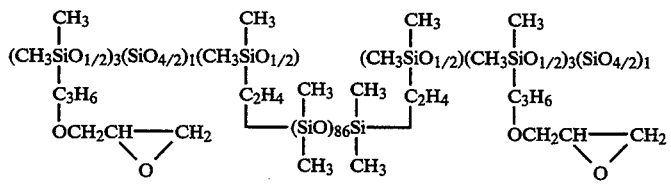

EXAMPLE 3

Ten weight parts of a tetrakisdimethylsiloxysilane with the formula

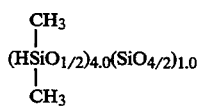

98.5 weight parts of a dimethylopolysiloxane with the formula

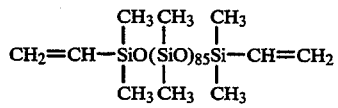

EXAMPLE 4

Forth weight parts of an organopolysiloxane with the formula

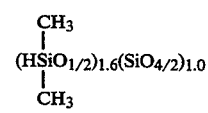

127.8 weight parts of a dimethylsiloxane-methylphenylsiloxane copolymer with the formula

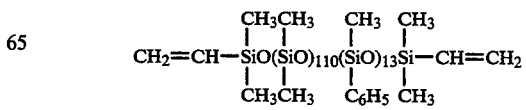

37.0 weight parts of allyl glycidyl ether, and 80 weight parts of toluene were placed in a 500 mL four-neck flask equipped with stirrer, reflux condenser, and thermometer. The water in the system was removed as the azeotrope by heating, and the system was then cooled under a nitrogen blanket. Ten drops of 2 weight % isopropanolic chloroplatinic acid solution was then dripped into the system from a syringe, followed by heating with stirring at 120° C. for 1.5 hours and cooling to room temperature. Allyl glycidyl ether (11.5 weight parts; dried over molecular sieve) was added followed by heating at 120° C. for 1 hour and then heating at 120° C./2 mmHg to remove the toluene and excess allyl glycidyl ether. A light brown, transparent liquid (205.9 weight parts) was obtained.

This light brown, transparent liquid had a viscosity of 10,000 centipoise. When it was held at room temperature for 4 months, it separated into a brown transparent liquid (upper layer) and a brown opaque liquid (lower layer) in a weight ratio of 8:1. When the transparent, light brown liquid (upper layer) was analyzed by gel permeation chromatography, it was found to be composed of the following 2 components in a weight ratio of 95.4 to 4.6: a product with weight-average molecular weight $(M_w)=39,500$ (polystyrene standard) and dispersity $(M_w/M_n)=2.12$, and a product with weight-average molecular weight $(M_w)=1,380$ (polystyrene standard) and dispersity $(M_w/M_n)=1.06$. The former product was confirmed to be diorganopolysiloxane with the following formula.

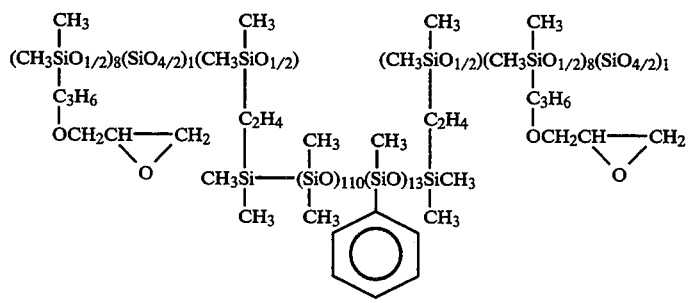

The latter product was confirmed to be organopolysiloxane with the following formula.

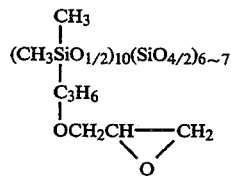

EXAMPLE 5

Fifty weight parts of an organopolysiloxane with the formula

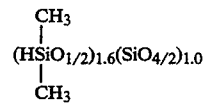

131.8 weight parts of a dimethylpolysiloxane with the formula

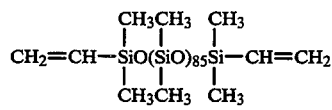

15.2 weight parts of allyl glycidyl ether, 21.4 weight parts of allyltrimethoxysilane, and 200 weight parts of toluene were placed in a 1 L four-neck flask equipped with stirrer, reflux condenser, and thermometer. The water in the system was removed as the azeotrope by heating, and the system was then cooled under a nitrogen blanket. Ten drops of 2 weight % isopropanolic chloroplatinic acid solution was dripped into the system from a syringe, followed by heating with stirring at 120° C. for 1 hour and cooling to room temperature. Allyl glycidyl ether (15.1 weight parts; dried over molecular sieve) and 21.4 weight parts allyltrimethoxysilane (dried over molecular sieve) were added followed by heating at 110° C. for 2 hours and then heating at 120° C./2 mmHg to remove the toluene and unreacted allyl glycidyl ether and allyltrimethoxysilane. A brown, opaque liquid (235.4 weight parts) was obtained.

This brown, opaque liquid became a brown, transparent liquid at 115° C. and above, and the former had a viscosity of 2,800 centipoise. When the brown, opaque liquid was subjected to infrared spectrochemical analysis, absorption characteristic of the Si—H bond was observed to a small degree. When the brown, opaque liquid was held for 5 months at room temperature, it separated into a cloudy white liquid (upper layer) and a transparent brown liquid (lower layer) in a weight ratio of 18:1. When the cloudy white liquid upper layer was analyzed by gel permeation chromatography, it was found to be composed of the following 2 components in a weight ratio of 90.8 to 9.2: a product with weight-average molecular weight $(M_w)=30,300$ (polystyrene standard) and dispersity $(M_w/M_n)=2.21$, and a product with weight-average molecular weight $(M_w)=1,910$ (polystyrene standard) and dispersity $(M_w/M_n)=107$. The former product was confirmed to be a diorganopolysiloxane with the following formula.

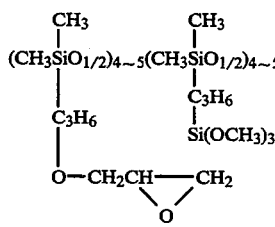
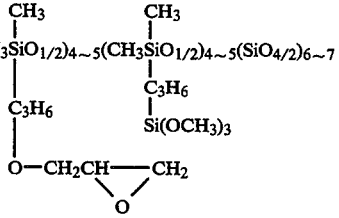

The latter product was confirmed to be organopolysiloxane with the following formula.

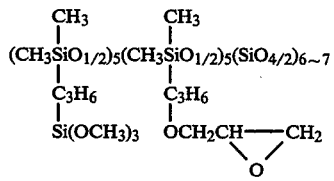

That which is claimed is:

1. A diorganosiloxane polymer terminated at each molecular end with an epoxy group-containing organopolysiloxane residue of the following general formula

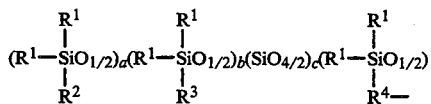

wherein $R^1$ is a monovalent hydrocarbon group free of alkenyl groups, $R^2$ is selected from the group consisting of hydrogen and a monovalent hydrocarbon group free of alkenyl groups, $R^3$ is a monovalent group selected from the group consisting of an epoxy group-containing organic group and an alkoxysilylalkyl group, with the proviso that at least one $R^3$ group is an epoxy group-containing organic group, $R^4$ is a divalent hydrocarbon group, a is zero or a positive number, b is a positive number, c is a positive number, a/c is a number in the range of zero to 4, b/c is a positive number in the range of 0.05 to 4, and (a+b)/c is a positive number in the range of 0.2 to 4.

2. The polymer according to claim 1, wherein said diorganosiloxane is selected from the group consisting of polymers of dimethylsiloxane units, polymers of methylphenylsiloxane units and copolymers of dimethylsiloxane units with methylphenylsiloxane units.

3. The polymer according to claim 2, wherein the epoxy-containing organic groups of $R^3$ are selected from the group consisting of glycidoxyethyl, glycidoxypropyl and 3,4-epoxycyclohexylethyl.

4. The polymer according to claim 3, wherein the alkoxysilylalkyl groups of $R^3$ are selected from the group consisting of trimethoxysilylethyl, trimethoxysilylpropyl, dimethoxymethylsilylpropyl, methoxydimethylsilylpropyl, triethoxysilylethyl and tripropoxysilylpropyl.

5. The polymer according to claim 1, wherein $R^1$ is a methyl radical and $R^2$ is H or a methyl radical.

6. The polymer according to claim 2, wherein $R^1$ is a methyl radical and $R^2$ is H or a methyl radical.

7. The polymer according to claim 3, wherein $R^1$ is a methyl radical and $R^2$ is H or a methyl radical.

8. The polymer according to claim 4, wherein $R^1$ is a methyl radical and $R^2$ is H or a methyl radical.

9. A method for preparing a diorganopolysiloxane polymer comprising reacting in the presence of
(A) a platinum group metal catalyst:
(B) an organopolysiloxane having the general formula

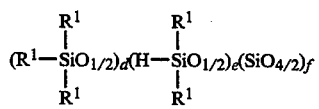

wherein $R^1$ is a monovalent hydrocarbon group free of alkenyl groups, d is zero or a positive number, e is a positive number, f is a positive number, d/f is a number in the range of zero to 4, e/f is a positive number in the range of 0.05 to 4, and (d+e)/f is a positive number in the range of 0.2 to 4;
(C) an epoxy group-containing, aliphatically unsaturated organic compound;
(D) a diorganopolysiloxane which has alkenyl groups at both of its molecular chain terminals; and, optionally,
(E) an alkoxysilylalkene.

10. The method according to claim 9, wherein said diorganopolysiloxane is selected from the group consisting of polymers of dimethylsiloxane units, polymers of methylphenylsiloxane units and copolymers of dimethylsiloxane units with methylphenylsiloxane units.

11. The method according to claim 10, wherein said component (C) is selected from the group consisting of allyl glycidal either, butenyl glycidal ether and 1,2-epoxy-4-vinylcyclohexane.

12. The method according to claim 11, wherein the alkenyl groups of said component (D) are selected from the group consisting of vinyl, allyl and hexenyl.

13. The composition according to claim 12, wherein said alkoxysilylalkene is selected from the group consisting of trimethoxyvinylsilane, methoxydiphenylvinylsilane, methyldimethoxyvinylsilane, allyltrimethoxysilane and triethoxyvinylsilane.

14. The method according to claim 9, wherein $R^1$ is a methyl radical.

15. The method according to claim 10, wherein is $R^1$ methyl radical.

16. The method according to claim 11, wherein $R^1$ is a methyl radical.

17. The method according to claim 12, wherein $R^1$ is a methyl radical.

* * * * *